United States Patent [19]
Parsey et al.

[11] 3,800,019
[45] Mar. 26, 1974

[54] PROCESS FOR PRODUCING ROPE STRUCTURES

[75] Inventors: Michael Richard Parsey, Campion; Alexander David, Harrogate, both of England

[73] Assignee: Imperial Chemical Industries Limited, London, England

[22] Filed: Mar. 17, 1970

[21] Appl. No.: 20,329

Related U.S. Application Data
[63] Continuation-in-part of Ser. No. 637,936.

[30] Foreign Application Priority Data
May 20, 1966   Great Britain .................... 22578/66

[52] U.S. Cl. ............... 264/102, 156/180, 156/286, 264/174
[51] Int. Cl. ............................................. B29f 3/10
[58] Field of Search ......... 264/174, 87, 86, 90, 101, 264/102, 136; 28/74, 75; 57/166, 164, 165, 147, 149, 153; 18/13 H; 156/166, 167, 178, 441, 180, 285, 286, 287, 161; 161/175, 176, 170

[56] References Cited
UNITED STATES PATENTS

| | | | |
|---|---|---|---|
| 3,627,572 | 12/1971 | Barnett | 264/88 |
| 3,646,186 | 2/1972 | Hager | 264/174 |
| 2,041,798 | 5/1936 | Taylor | 156/167 |
| 2,571,717 | 10/1951 | Howald et al. | 156/180 |
| 2,751,320 | 6/1956 | Jacobs et al. | 156/180 |
| 2,979,431 | 4/1961 | Perrault | 156/180 |
| 3,394,213 | 7/1968 | Roberts et al. | 264/174 |
| 3,557,403 | 1/1971 | Lemelson | 18/13 |
| 3,444,031 | 5/1969 | Schrenk | 161/3.5 |
| 3,487,504 | 1/1970 | Shanok et al. | 18/13 H |
| 3,551,280 | 12/1970 | Kippan | 161/175 |
| 1,681,566 | 8/1928 | Anderegg | 264/174 |
| 2,401,550 | 6/1946 | Cook | 264/174 |
| 2,471,752 | 5/1949 | Ingmanson | 264/174 |
| 2,956,305 | 10/1960 | Raydt et al. | 264/174 |
| 3,415,919 | 12/1968 | Kippan | 264/174 |
| 3,533,870 | 10/1970 | Mackay et al. | 161/175 |

*Primary Examiner*—Jay H. Woo
*Attorney, Agent, or Firm*—Cushman, Darby & Cushman

[57] ABSTRACT

A rope structure is made by compacting a bundle of synthetic filaments by passing the bundle through a compacting die, further compacting the bundle by subjecting it to a reduced atmospheric pressure and, while the bundle is compacted, extruding a plastic sheath around the bundle.

10 Claims, 1 Drawing Figure

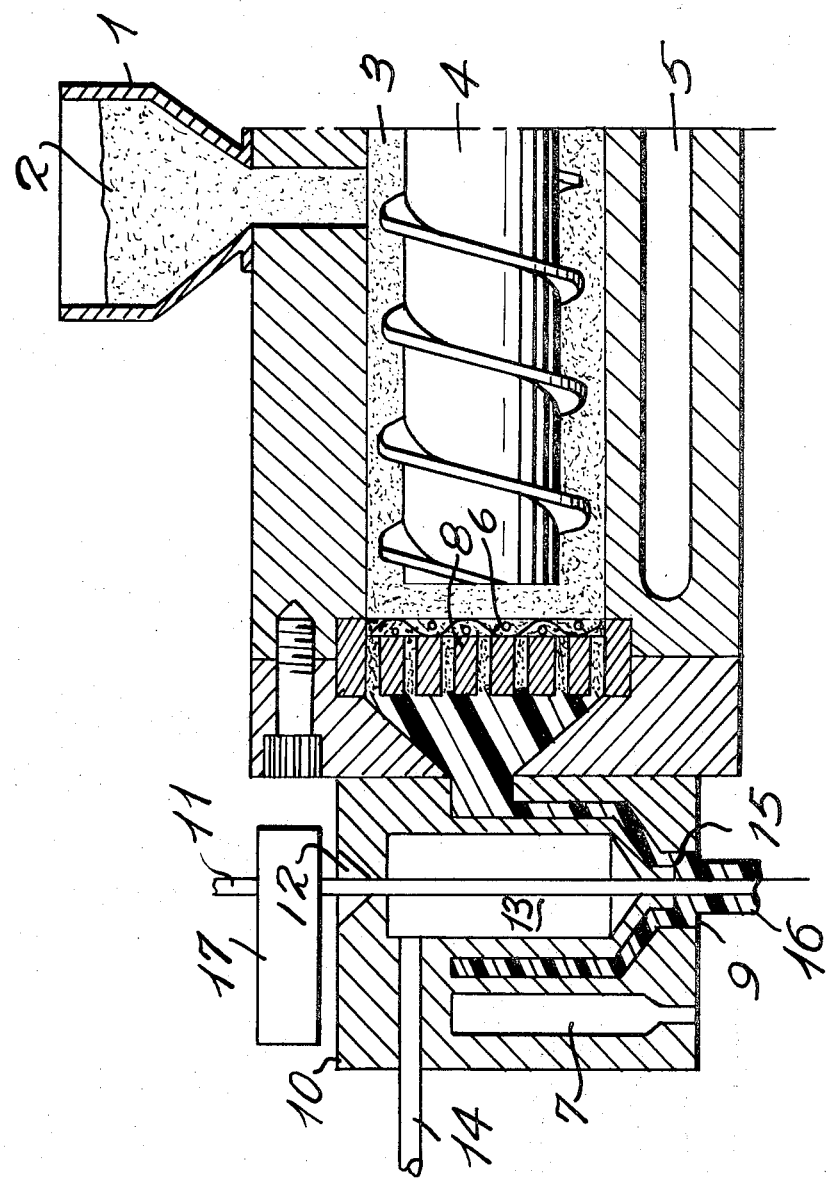

PROCESS FOR PRODUCING ROPE STRUCTURES

This is a continuation-in-part of application, Ser. No. 637,936, filed May 12, 1967, now abandoned.

This invention relates to ropes, in particular to a process for the production of rope structures, of high stretch resistance having a core of substantially parallel filaments and an organic thermoplastic sheath.

Since the advent of synthetic organic fibres, which possess greatly improved properties, for example uniformity, high strength and resistance to degradation, compared with natural fibres, much effort has been devoted to developing the use of such synthetic fibres in the manufacture of ropes and cordage. As a result of this effort synthetic fibre ropes having highly desirable properties have tended to replace natural fibre ropes in many uses. Fibre ropes whether made from natural or synthetic fibres are twisted structures, in fact structures which are made up by twisting already twisted unit structures. Such multiply-twisted structures are often too extensible for some uses due in part to the inherent extensibility of the fibres composing the structures and in part to the twist in the structures acting after the fashion of a coiled spring. Such twisted structures are also of reduced tensile strength compared with the combined tensile strength of the fibres composing them, usually retaining only 25–50 percent of the original fibre strength.

Steel wire ropes have a low extensibility or, as alternatively expressed, a higher stretch resistance, but they are heavy and, unless specially treated, are subject to weakening by corrosion, which requires frequent and costly maintenance for its prevention. Synthetic fibre ropes of lower extensibility have been produced simply by the extrusion coating of a core of parallel fibres but such ropes do not have the compactness of structure and stability of cross-sectional shape when bent, which is desired in ropes, particularly ropes of large circumference.

According to the present invention we provide a process for the production of rope structures which comprise a core of at least one bundle of substantially parallel filaments, the bundles if more than one is present being arranged substantially parallel to one another and an exterior sheath of thermoplastic organic material, said method comprising subjecting a longitudinally moving bundle of substantially parallel filaments selected from the group consisting of polyethylene terephthalate, polyethylene, isotactic polypropylene, nylon 6, nylon 66, glass or regenerated cellulose filaments and mixtures of two or more of these to a first compacting operation by passing the bundle through a compacting die, subjecting the bundle to a second compacting operation by passing the bundle into a zone of reduced atmospheric pressure, and while said moving bundle remains so compacted, extrusion coating the entire exterior surface of the bundle with a complete exterior sheath of a thermoplastic organic material selected from the group consisting of branched polyethylene, linear polyethylene, polyvinyl chloride, polyethylene terephthalate, polyhexmethylene adipamide, polyurethanes and stereoregular polypropylene.

Filament bundles or an assemblage of bundles are preferably held together before compaction and coating by wrapping with a binding means, as for example tape or twine of the adhesive or nonadhesive kind. A binding means used to wrap the structure is preferably a material of a lower extensional modulus than the core material and which does not exhibit creep at the loads to which it is subject in use.

The binding means is applied preferably as a helical wrapping of wide pitch such that the structure is held in the compact state without impeding the effect of application of a reduced atmospheric pressure environment.

When the binding means of low heat shrinkage compared with the core material it is found that in the extrusion coating with hot thermoplastic material there is a tendency for the binding to separate from the core and to become embedded in the sheath thereby imparting a useful reinforcement thereto. In cases where a high resistance to cutting is desired in the final rope structure a steel tape or wire binding means may be used, for as described above this will tend to become embedded in the sheath thus reinforcing it and improving its resistance to cutting. If a metallic binding is used it may form a convenient means for detecting damage to the sheath by measurement of the electrical resistance between the ends of the binding means. An alternative means of detecting wear in the rope is to sheath the core with two organic coatings of different colours, a colour change in the outside of the rope will then indicate a degree of wear requiring replacement or reapplication of a new sheath. It is a feature of the sheathed ropes according to this invention that their useful life may be considerably increased by the simple expedient of re-sheathing.

A rope produced according to this invention does not deform or deforms very little in the transverse direction when subjected to pressure or bending but nevertheless is sufficiently flexible to be used in situations where the rope is subjected to pressure and/or bending, as for example in winching and mooring operations. In such operations care must be taken to select an abrasion resistant sheathing material if the rope is not to fail because of wear of the sheath.

A wide range of applied reduced pressure may be used in this invention to produce the required further compaction. It is preferred that the reduction in pressure below atmospheric is at least about 20 cm. of mercury; that is a pressure of at most about 60 cm. of mercury is applied. The density of the core, after compaction and sheathing should be at least 60 percent of the density of the material of the filaments.

In producing ropes according to this invention greater efficiency in converting the inherent filament strength to rope strength is achieved than in any structure wherein twisting is used and if the compacting is carefully maintained rope cores having a high density may be obtained. Compact sheathed ropes produced according to this invention, when compared with ropes of the same type having a lower degree of compaction, i.e., prepared without the application of vacuum, show a significantly reduced tendency for buckling of the sheath to occur when a length of the rope is compressed axially or bent. For measurement of this tendency a specimen of the rope 34 cm. long is held in clamps which are capable of swivelling about an axis perpendicular to the axis of the rope. When the specimen is straight an 18 cm. length of it is exposed between the ends thereof and the pivot points. The clamps are then gradually brought together causing the specimen to bend about its centre point and the distance between the pivot points is measured when a buckle in the sheath 5 mm. high has been formed. Alternatively, a simpler test may be used for small diameter ropes which can be bent by hand. Specimens of rope, 15 cm. long are bent manually until a sudden change in resistance to bending is experienced, at which point there is visual evidence of buckling or other distortion of the rope sheath. A measurement of the distance between the free ends of the specimen taken at this point is a measure of the buckling resistance, the smaller this distance the higher the buckling resistance.

Any synthetic filament in continuous filament form may be used as the core material and the filaments may be of circular or non-circular cross-section or in the form of ribbons. We prefer to use synthetic filaments which have a high extension modulus and preferably also a low extension at break, as for example, polyethylene terephthalate or isotactic polypropylene filaments. Filaments prepared from blends of branched polyethylene and polypropylene or blends of polypropylene and elastomeric olefine copolymers may also be used. Mixtures of synthetic filaments containing a high proportion of filaments which have a high extension modulus may also be used in the process of the present invention. The choice of materials actually used is primarily dependent upon the rope properties required and the cost of the materials and the mixture chosen may include filaments of lower extension modulus as for example, nylon 6 or nylon 66 filaments. In certain uses fibres having a high density in addition to high strength and extension modulus are required, in which case glass fibres and certain regenerated cellulose fibres are very suitable. In certain marine uses, as for example long, static moorings in deep water, ropes having a neutral buoyancy, that is a density close to that of sea water, are sometimes required. For this purpose mixtures of synthetic filaments having different densities may be utilised according to the present invention to produce a strong rope of neutral buoyancy. Alternatively the density of the final rope may be altered by controlling other factors. Thus a rope of neutral buoyancy may be produced, for example, by using a core of polypropylene filaments which have a specific gravity of about 0.91, binding these in the first stage of compaction with a tape of higher density such as polyethylene terephthalate of specific gravity 1.38 and finally sheathing the structure with linear polyethylene (specific gravity about 0.95) or by using a low density core and an appropriate thickness of a dense sheathing material.

The term bundle is used herein to denote a group of filaments arranged in parallel fashion. Such a group may be assembled by combining together without twisting a number of filamentary yarns to produce the larger bundle required for a rope core or the bundle may be produced by melt spinning directly in the required size as a tow, that is to say a large aligned bundle of parallel filaments having no twist.

Exemplary of suitable sheathing materials are coatings of branched or linear polyethylene or blends thereof, polyvinyl chloride, polyesters such as polyethylene terephthalate, polyamides such as polyhexamethylene adipamide, polyurethanes or stereoregular polypropylene. The sheathing may be of either smooth or ridged external form and is preferably of thickness between 0.8 and 7 millimetres. If the sheathing material is subject to degradation by light or other external influences a stabilising substance may be incorporated in the polymer before extrusion or the sheathed rope may be treated so as to produce a surface layer of resistant material. Many substances which have a stabilising action in thermoplastic organic materials are well known, for example ultraviolet light absorbers and phenolic antioxidants in polyolefines and organo-tin compounds in chlorinated hydrocarbon polymers.

Wrapping machines suitable for applying a binding means in the process of this invention are known for example in the production of continuous lengths of black powder fuses in the explosives industry. Such machines are usually arranged to wrap the material passing through the machine at substantially the same time as it is passed through a compression die and this form of operation is suitable for effecting and maintaining the first stage of compaction of a rope core according to this invention. Wrapping machines of the foregoing kind are sometimes referred to as orbital countering head machines.

An extrusion machine suitable for use in this invention comprises a hopper containing a supply of thermoplastic coating material, means for supplying this in a molten state to the surface of the substrate, a die as aforementioned, wherein a reduced pressure is applied to compact the substrate prior to coating and means to draw a filamentary core through the compacting and coating steps.

The sole FIGURE is a longitudinal sectional view of apparatus suitable for carrying out the process of the present invention.

In the drawing a hopper 1 supplies granular thermoplastic material 2 to the barrel 3 of a screw extruder in which a screw 4 is turned by means not shown, to convey the material 2 along the barrel 3 while it is heated by an electric element 5 to the thermoplastic or molten condition. Unmelted or foreign particles are removed from the stream of material 2 by a screen 6 and the flow of molten material is evened up by the distributor plate 8 whence the material passes along a channel to the annular opening 9 in the die block 10 which is fitted to the face of barrel 3 and heated by electric heater 7. A filamentary core 11 is passed through a compression die 12 in the die block 10 and enters chamber 13 which is connected to a source of reduced pressure, as for example a vacuum pump or steam ejector, by the tube 14. Core 11 fits closely in die 12 and has a self sealing effect to maintain the reduced pressure within chamber 13. Chamber 13 extends inside the die block 10 to an exit orifice 15 which is surrounded by the annulus 9 containing the molten material 2. The core is thus further compacted by the reduced pressure in chamber 13 and is subjected to this reduced pressure at least up to the exit orifice 15. In fact the effect of the reduced pressure is to some extent carried through the exit orifice and serves to draw the annular stream of molten material 2 into close contact with the core 11. The sheathed structure 16 is then allowed to cool before being wound up in a coil additional water cooling being used if required.

If it is desired to hold the filaments of the core 11 together before compaction and coating, this may be accomplished with a wrapping machine, illustrated schematically at 17, which wraps the core 11 with a binding tape or binding twine at substantially the same time as the core 11 passes through the die 12.

As shown in the drawing extrusion is effected vertically downward but the apparatus may be arranged to extrude the sheathed structure horizontally in which case it is preferable to maintain it under some tension to prevent drooping until the sheath has solidified.

Ropes produced as in this invention are distinguished by, in particular their high stretch resistance and also by their low creep, low extension at break and high resistance to kinking. Stretch resistance is conveniently measured as the slope of the load/extension graph obtained in making a measurement of tensile strength. For comparison of one rope with another the slope is appropriately calculated at a set loading which we arbitrarily select as 25 percent of the breaking load. For measuring the stretch resistance and other tensile properties of ropes according to this invention any suitable tensile testing machine may be used, as for example the common-used Instron Tester but due to difficulty in preventing slippage in the normal clamping jaws it is necessary to replace these with a clamping device which will prevent such slippage. Thus, for example, the device described in copending Ser. No. 678916 may be used or the end of the rope with the sheath removed may be embedded in a polyester or epoxy resin retained in a steel shell to which the jaws of the testing machine are attached.

Ropes produced according to this invention have properties in particular, stretch resistance and extension at break more nearly approaching the properties of steel wire ropes than ropes constructed by other methods from synthetic or natural fibres. Ropers of the present invention have advantages over steel ropes in that they are very much lighter for equal strength, are incorrodible, are unkinkable and are of higher crush resistance and flexibility.

The following Examples illustrate the invention and the manner in which it may be performed. To illustrate the improved properties in ropes produced as in this invention a comparative example are also included.

EXAMPLES 1 and 2

Polyethylene terephthalate yarn having 192 filaments of total denier 1,000 and of tenacity 8.5 grams per denier was used as the raw material for preparation of the twistless core, which was a single bundle formed by combining without twist 200 ends of the substantially twistless 1,000 denier yarn. The yarn bundle was passed through a first die of 6.4 mm. diameter into a wrapping machine which applied ten ends of nylon twine (three ends of 210 denier multifilament yarn twisted together) at a wrapping rate of 20 revolutions per minute to maintain the bundle in its compacted state. From the wrapping machine the compacted bundle was passed into an extrusion coating machine wherein a reduced pressure of 12.5 cm. of mercury was applied to it within the die immediately before coating with molten branched polyethylene (density of polymer 0.919) the temperature of which was 205°C. The die used was of 8.0 and 20 mm. diameter entry and exit respectively and the bundle was passed through the two machines, wrapping and coating at the same speed which differed in each example as shown in the following Table wherein the properties of the ropes produced are also given. A cold water jet placed 8 cm. from the coating machine exit was used to cool the sheathed filamentary bundle.

TABLE

| Ex. | Linear Speed (m./min.) | Sheath thickness (mm.) | Core Density* | Buckling Resistance (cm.) | Stretch Resistance Kg/% extension |
|---|---|---|---|---|---|
| 1 | 0.9 | 3.1 | 70% | 0 | 85 |
| 2 | 1.8 | 1.7 | 87% | 4.8 | 130 |

* Expressed as % of density of the material comprising the core filaments.

COMPARATIVE EXAMPLE A

A sheathed rope structure, prepared as in Example 1 but without maintaining the bundle in its compacted form by binding and without further compaction before the coating (3.1 mm. thick) was applied, had the following inferior properties:

Core Density 60 percent
Buckling Resistance 8.3 cm.
Stretch Resistance 57 Kg/percent extension

EXAMPLE 3 AND COMPARATIVE EXAMPLE B

Two sheathed rope structures are prepared by passing a substantially twistless core comprising 100 ends of 1,000 denier filament yarn as used in Examples 1 – 2 directly into the extrusion coating machine, wherein a sheath of molten polyethylene at a temperature of 205°C is applied, in one case with the intermediate application of a reduced pressure of 12.3 cm. of mercury and in the other case without such application of reduced pressure other conditions being identical. The structures produced have the following properties, the buckling resistance being measured on 15 cm. specimens by the foregoing simplified method.

| Coating Conditions | Overall Diameter (cm.) | Sheath Thickness (cm.) | Buckling Resistance (cm.) | Core Density % |
|---|---|---|---|---|
| With reduced pressure— Example 3 | 7.0 | 1.7 | 0* | 64 |
| Without reduced pressure— Comparative Example B | 7.7 | 1.2 | 5 | 42 |

* In fact it was possible to cross over the free ends some distance before any change of resistance was felt.

In the case of the rope produced without the application of reduced pressure the core filaments are quite loose within the sheath and may be easily withdrawn in a body from a short length of the rope. No such looseness or ease of withdrawal occurs when a process according to this invention is used.

What we claim is:

1. A process for the production of rope structures which comprise a core of at least one bundle of substantially parallel filaments, the bundles if more than one is present being arranged substantially parallel to one anther and an exterior sheath of thermoplastic organic material, said method comprising subjecting a longitudinally moving bundle of substantially parallel filaments selected from the group consisting of polyethylene terephthalate, polyethylene, isotactic polypropylene, nylon 6, nylon 66, glass or regenerated cellulose filaments and mixtures of two or more of these to a first compacting operation by passing the bundle through a compacting die, subjecting the bundle to a second compacting operation by passing the bundle into a zone of reduced atmospheric pressure, and while said moving bundle remains so compacted, extrusion coating the entire exterior surface of the bundle with a complete exterior sheath of a thermoplastic organic material selected from the group consisting of branched polyethylene, linear polyethylene, polyvinyl chloride, polyethylene terephthalate, polyhexamethylne adipamide, polyurethanes and stereoregular polypropylene.

2. A process as in claim 1 wherein the step of passing the bundle of filaments into a zone of reduced atmospheric pressure is carried out by passing the bundle through a circumferentially enclosing orifice into a chamber and at least partially evacuating the chamber.

3. A process as in claim 2 including passing the bundle of filaments out of the chamber through a circumferentially enclosing exit orifice, and wherein the step of extrusion coating is carried out by extruding the thermoplastic material through an annulus surrounding the exit orifice.

4. A process according to claim 1 wherein the bundle or bundles are held together before compaction and coating by wrapping with a binding means.

5. A process according to claim 4 wherein the binding means is an adhesive or non-adhesive tape or twine.

6. A process according to claim 1 wherein the filaments are prepared from blends of branched polyethylene and polypropylene or blends of polypropylene and elastomeric olefine copolymers.

7. A process according to claim 1 wherein the thickness of the sheath is between 0.8 and 7 mm.

8. A process as in claim 1 wherein the reduced pressure in the second compacting operation is below about 60 cm of mercury and wherein the filaments are compacted to at least 60 percent of the density of the material of the filaments by the compacting action of the die and of the reduced pressure.

9. A process as in claim 8 wherein the filaments are compacted to at least 70 percent of the density of the material of the filaments by the compacting action of the die and of the reduced pressure.

10. A process for the production of rope structures which comprise a core of at least one bundle of substantially parallel filaments, the bundles if more than one is present being arranged substantially parallel to one another and an exterior sheath of thermoplastic organic material, said method comprising mechanically compacting a moving bundle of substantially parallel filaments selected from the group consisting of polyethylene terephthalate, polyethylene, isotactic polypropylene, nylon 6, nylon 66, glass or regenerated cellulose filaments and mixtures of two or more of these, further compacting the mechanically compacted moving bundle to at least 60 percent of the density of the material of the filaments by subjecting the moving bundle to a reduced atmospheric pressure of below about 60 cm of mercury, coating the entire exterior surface of the so compacted bundle with a complete exterior sheath of a thermoplastic organic material selected from the group consisting of branched polyethylene, linear polyethylene, polyvinyl chloride, polyethylene terephthalate, polyheramethylene adipamide, polyurethanes and stereoregular polypropylene by extruding a molten annular stream of the thermoplastic material around the so compacted filaments, while utilizing the reduced pressure to draw the annular stream of thermoplastic material into close contact with the bundle, and cooling the resulting sheathed structure.

* * * * *